United States Patent

Galland et al.

[11] 4,194,535
[45] Mar. 25, 1980

[54] QUICK-CLOSING MULTI-WAY VALVES

[75] Inventors: Denis Galland, Rueil Malmaison; Jack Boursault, Genlis, both of France

[73] Assignee: L'Air Liquide, Societe Anonyme pour l'Etude et l'Exploitation des Procedes, Paris, France

[21] Appl. No.: 853,856

[22] Filed: Nov. 22, 1977

[30] Foreign Application Priority Data

Nov. 22, 1976 [FR] France .................. 76 35067

[51] Int. Cl.² ...................... F16K 11/14; F23D 13/38
[52] U.S. Cl. .................... 137/636.4; 137/595; 137/601; 239/414; 251/257
[58] Field of Search ........... 137/594, 595, 601, 636.1, 137/636.4, 607, 636, 637, 625.18; 251/251, 257–259, 262, 263, 296; 239/414, 415

[56] References Cited

U.S. PATENT DOCUMENTS

| 731,910 | 6/1903 | Johnson | 239/414 |
| 2,301,439 | 11/1942 | Moen | 137/636.1 |
| 2,417,577 | 3/1947 | Van Denberg et al. | 137/66 |
| 2,635,010 | 4/1953 | Sanders et al. | 239/415 |
| 2,762,427 | 9/1956 | Tierney | 251/262 X |
| 2,869,582 | 1/1959 | Skipwith | 251/257 X |
| 3,537,479 | 11/1970 | Nelson | 137/636.4 |

FOREIGN PATENT DOCUMENTS

| 153775 | 8/1904 | Fed. Rep. of Germany | 251/257 |
| 537703 | 7/1941 | United Kingdom | 137/636.1 |
| 620037 | 3/1949 | United Kingdom | 137/636.1 |
| 709900 | 6/1954 | United Kingdom | 137/636.4 |
| 727864 | 4/1955 | United Kingdom | 137/636.2 |
| 864385 | 4/1961 | United Kingdom | 137/636.1 |
| 1030511 | 5/1966 | United Kingdom | 137/636.4 |
| 1231336 | 5/1971 | United Kingdom | 137/628 |

Primary Examiner—Martin P. Schwadron
Assistant Examiner—Richard Gerard
Attorney, Agent, or Firm—Lee C. Robinson, Jr.

[57] ABSTRACT

A tap for controlling a plurality of fluid circuits simultaneously, comprising a body provided with a bore into which the said circuits open, and a rotary control member.

Each fluid inlet duct is provided with a valve member and the rotary control member is a stem, movable in translation, which is provided with cams and cut-aways and controls the opening and closing of the said valve members.

The invention is applicable in particular to oxyacetylene torches.

13 Claims, 5 Drawing Figures

QUICK-CLOSING MULTI-WAY VALVES

BACKGROUND OF THE INVENTION

The present invention relates chiefly to valves for controlling a plurality of fluid circuits simultaneously, of the kind having a body provided with a bore into which open at least one fluid inlet duct and at least one fluid outlet duct forming part of one of said circuits, and a rotary control member housed in the said bore which is adapted to permit or interrupt communication between the said fluid inlet and outlet ducts belonging to one and the same circuit.

Multi-way valves are used, broadly speaking, in any apparatus in which it is necessary to control the flow of a plurality of liquid or gaseous fluids at the same time, whether these fluids are intended to remain seperate or to mix. Amongst other equipment, such valves are fitted to apparatus for operating on materials by flame-produced heat, such as burner torches, which are generally supplied with at least two different gases (such as acetylene and oxygen, propane and oxygen, etc), these gases being conducted through two separate circuits into chambers where they mix and where combustion takes place.

Valves of the above mentioned kind are used in particular to control the two gas circuits of hardening torches. In these known valves, the fluid inlet and outlet ducts of each of the two circuits communicate directly with the above mentioned bore. The control member is formed by a plug having a gentle friction fit in the said bore and which is provided with two orifices which, depending upon the angular position of the said plug, either do or do not allow communication between the inlet and outlet ducts of one and the same circuit.

These known valves have many disadvantages. A changeover from the open position to the closed position can only be achieved by turning the plug, that is to say by an operation which takes up a not inconsiderable period of time, the length of which may be a disadvantage in case of accident, for example when it is necessary for the gas supply to be shut off very quickly. Furthermore, in the closed position the plug does not close off the fluid inlet ducts hermetically and this causes leaks. Finally, such valves do not allow the rates of flow of the fluids to be adjusted gradually nor do they allow there to be a difference in time between the opening (or closing) of one circuit relative to another.

SUMMARY OF THE INVENTION

It is an object of the invention to overcome or minimise these disadvantages and accordingly it provides a valve in which each fluid inlet duct is provided with a closing valve-member which is subject to the effect of a return spring which tends to press it against a fixed seating, and in which the rotary control member is formed by a stem which is movable in translation axially between two extreme positions of which one is an operating position and the other a shut-off position, said stem defining, with the bore, annular spaces which allow the inlet and outlet ducts of one and the same circuit to communicate with one another, and being provided with means for controlling the valve-members which, in the operating position, cooperate with said valve-members to lift them from their seatings in opposition to said return springs and which, in the shut-off position, release said valve members.

The fact of providing each fluid inlet duct with a valve-member which is normally in the closed position and the fact of controlling the valve-members by means of a rotary stem which is arranged to release them, that is to say to allow them to close immediately under the prompting of their respective return springs, as a result of a simple translatory movement, allow the valve to be closed extremely quickly and thus the flow of the gases to be shut off almost instantaneously in case of need. In addition, the use of valve-members for closure ensures that the fluid inlet ducts are properly sealed.

In accordance with another feature of the invention, each valve-member may be provided with a spigot which projects into the bore and the aforesaid control means of the control member includes a plurality of cams, each associated with one of said valve members, which in the operating position, are intended to come into contact with said spigots.

The use of cams enables the opening and closing of the circuits to be controlled accurately.

In accordance with another feature of the invention the aforesaid control means may also include a plurality of cut-aways, each situated in the immediate vicinity of a cam, which, in the shut off position, come into place opposite the spigot which co-operates with the said cam so as to allow the valve-member to close under the prompting of its associated return spring.

These cut-aways do in fact allow the spigot an unobstructed travel and thus allow the valve-member to be pressed onto its seating.

In accordance with yet another feature of the invention, some at least of the aforesaid inlet ducts may communicate with the bore via an auxiliary passage of smaller diameter which forms a bypass for the closing valve-member, and means may be provided to block the said auxiliary passage when the stem is in the shut off position.

This auxiliary passage provides a feed for a pilot flame which is extinguished in case of emergency or when required.

BRIEF DESCRIPTION OF THE DRAWINGS

Other features and advantages of the invention will become apparent in the course of the following description, referring to the accompanying drawings, which are given solely by way of non-limiting example and in which.

DETAILED DESCRIPTION OF THE PREFERRED EMBODIMENTS

Figure 1:
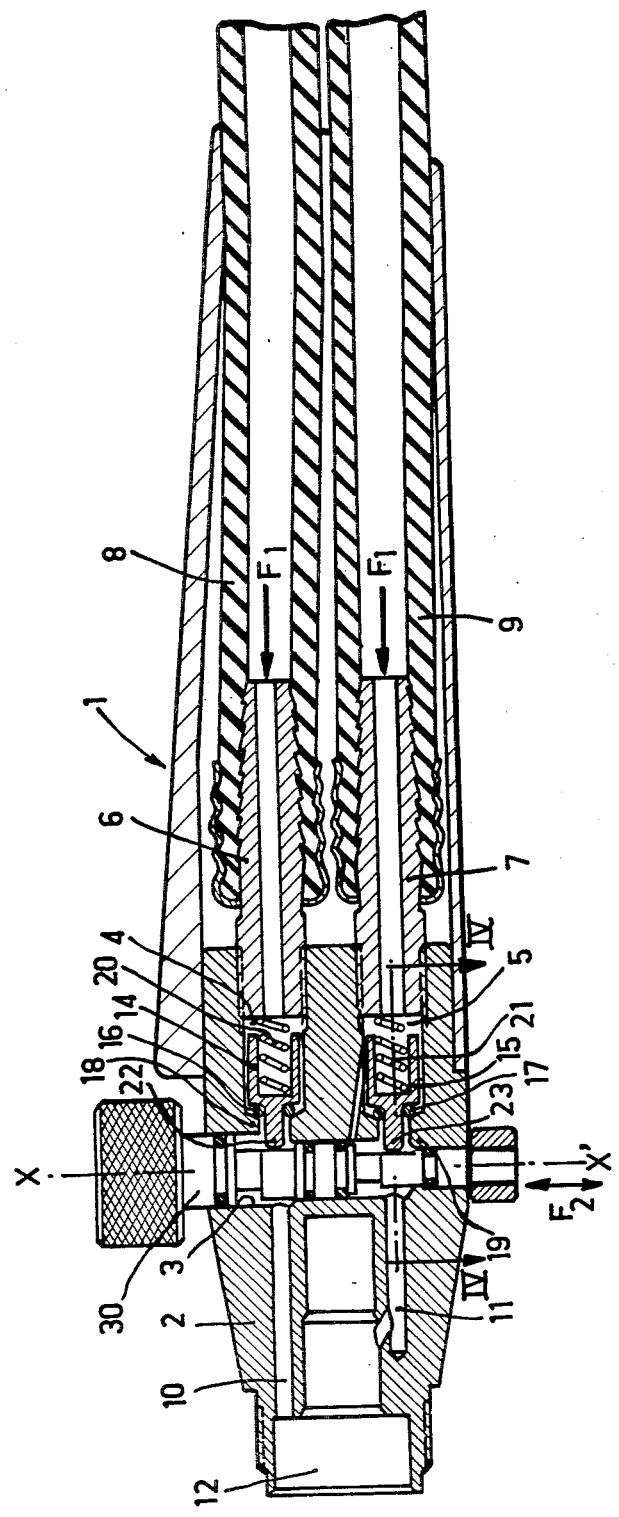
FIG. 1 shows a valve according to the invention fitted to a torch, the control member being shown in the operating position but with the fluid ducts closed.

Referring now to the drawings and in particular to FIG. 1, there is shown a torch having two circuits for gases (such as oxygen and acetylene for example), which is generally identified by the reference 1, this torch being fitted with a valve according to the invention. The valve has a body 2 through which passes a bore 3 of circular section whose axis is X X' and the valve contains two fluid inlet ducts 4 and 5 which open into the said bore perpendicularly to the axis X X'. The two ducts 4 and 5 are connected, by connectors 6 and 7 and pipes 8 and 9 respectively, to two sources (not shown) of gases under pressure (oxygen and acetylene). The body 2 is also provided with two fluid outlet ducts 10 and 11 which open on the one hand into the bore 3 and on the other hand into the mixing chamber 12 of the torch (the combustion chamber which follows the mixing chamber not being shown in the drawings). The outlet ducts 10 and 11 are functionally associated with inlet ducts 4 and 5 respectively and are arranged coaxially with the latter so that the said associated ducts 4 and 10 on the one hand and 5 and 11 on the other hand form part of one or other of the two gas circuits feeding the torch. In the fluid inlet ducts 4 and 5 are mounted valve members 14 and 15 respectively and the valve members are provided with sealing rings 16 and 17 which are intended to come to bear against fixed seatings 18 and 19 under the prompting of return springs 20 and 21. Each valve member has a spigot 22 or 23 which, when the said valve member is in the closed position, projects into the bore 3.

An auxiliary passage 13 provides a direct connection between duct 5 and bore 3 by forming a bypass to valve-member 15. This passage, whose diameter is appreciably smaller than that of duct 5, allows a small amount of gas to flow to duct 11 even when valve member 15 is closed and provides a feed for a pilot flame.

Figure 2:
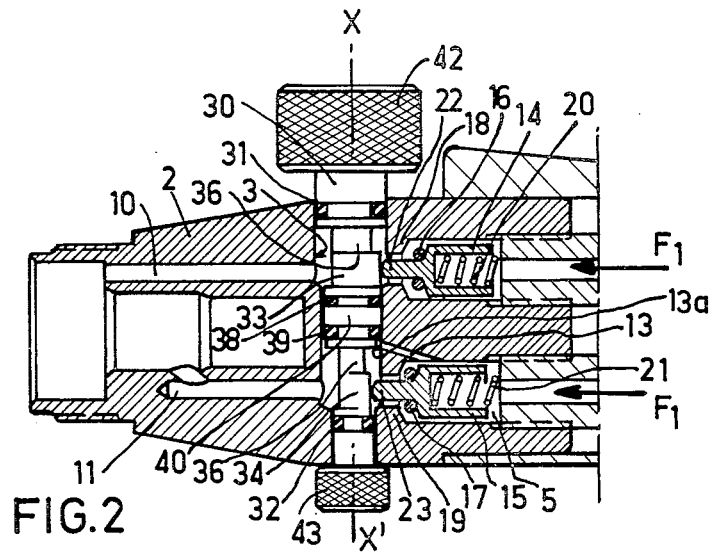
FIG. 2 is a partial view identical to FIG. 1 but showing the fluid inlet ducts open.
Figure 3:
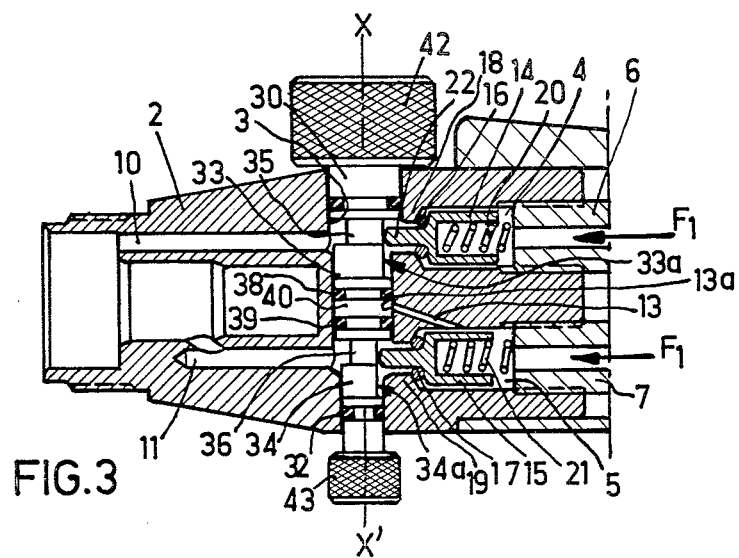
FIG. 3 is likewise a partial view identical to FIG. 1 showing the control member in the shut off position.
Figure 4:
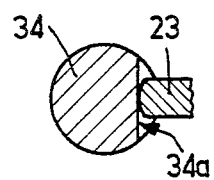
FIG. 4 is a partial section on line IV—IV of FIG. 1.

The control member is formed by a stem 30 accommodated in the bore 3. The stem is mounted to rotate in the said bore, its centre of rotation coinciding with axis XX', and it is also movable in translation between two extreme positions in the direction of the said axis, as indicated by the double headed arrow F2. At its ends, the stem 30 is provided with sealing glands 31 and 32 which prevent any leakage of fluid to the exterior. It is also provided with cams 33 and 34, which are intended to co-operate with the spigots 22 and 23 of valve members 14 and 15 respectively, and with cut-aways 35 and 36 which are situated in the immediate vicinity of cams 33 and 34 respectively and which are intended to allow the spigots 22 and 23 to enter the bore 3 without obstruction. As shown in FIG. 4, the cam 34 is in the form of a cylinder of circular crosssection coaxial with axis XX' and having a flat 34a. The cam 33 is of similar configuration. Sealing rings 38 and 39 on the central part of the stem allow the two gas circuits to be isolated from one another, which they do by forming between themselves an isolated and sealed gap 40. The travel of the stem 30 in the bore 3 is such that, in the operating position, i.e. the raised position shown in FIGS. 1 and 2, the cams 33 and 34 are situated opposite the spigots 22 and 23 and the opening 13a of passage 13 is unobstructed while, in the shut off position, that is to say the lowered position shown in FIG. 3 it is the cut-aways 35 and 36 which are opposite the spigots 22 and 23 while the gap 40 blocks the opening 13a of passage 13.

At the top, the stem is provided with an operating knob 42 which enables it to be turned and, by vertical pressure, to be moved downwards in translation, which brings it to the shut off position. At the bottom it is provided with a knob 43 which enables it to be propelled upwards in translation and thus to be brought to the operating position.

The raised position of the member 30, shown in FIG. 1 (flats of cams 33 and 34 opposite spigots 22 and 23, valve members 14 and 15 closed and passage 13 unobstructed), represents the torch on standby with the pilot flame on. The position shown in FIG. 2, which is the result of turning member 30 while in the raised position (the cylindrical parts of cams 33 and 34 opposite the spigots 22 and 23, valve members 14 and 15 open and passage 13 unobstructed), represents the torch operating normally, the two gases arriving in the chamber as indicated by arrows F1 and then igniting on making contact with the pilot flame. The position shown in FIG. 3, which results from sliding member 30 downwards (cut-aways 35,36 opposite spigots 22, 23, valve members 14, 15 closed, passage 13 blocked), represents the torch completely shut off. This latter position is reached by a simple vertical downwards pressure on the knob 42 whatever the angular position of member 30.

Figure 5:
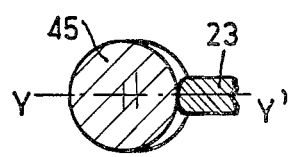
FIG. 5 is a sectional view identical to FIG. 4 but showing a modified embodiment.

Many modifications could be made to the embodiment described without departing from the scope of the invention. Thus, one of the cylindrical cams (33 for example) could for example be offset angularly from the other (34) to produce a corresponding displacement between the flats and thus a difference in the opening or closing time of one gas circuit relative to the other. By using in place of the cams 33, 34 coaxial with axis XX', cams such as 45 (see FIG. 5), that is to say cams which are likewise cylindrical and of circular cross-section but which have a vertical axis Y, Y' which does not coincide with axis XX', it is possible for the valve members 14 and 15 to be opened gradually. By displacing cams such as 45 angularly from one another, it will also be possible, as in the case of cams 33, 34 to achieve a difference between the opening and closing times of the two gas circuits.

We claim:

1. In a valve for controlling a fluid circuit, having a body provided with a bore into which open at least one fluid outlet duct and at least one fluid inlet duct which is provided with a closing valve-member which is subject to the effect of a return spring which tends to press it against a fixed seating, the invention which comprises a rotatably mounted stem which is movable in axial translation within said bore between two extreme positions of which one is an operating position and the other a shut off position, said stem defining, with said bore, an annular space which allows said inlet and outlet ducts to communicate with one another, and being provided with means for controlling said valve member which, in the operating position, cooperate with said valve member to lift it from its seating in opposition to said return spring and which, in the shut off position, permits the valve member to return to said seating, means carried by said stem and including a pair of spaced sealing members for forming a gap therebetween which is isolated with respect to the outlet duct, and means defining an auxiliary passage between said inlet duct and said bore to bypass said closing valve member, said auxiliary passage communicating with said outlet duct when said stem is in said operating position and communicating with said isolated gap when said stem is in said shut-off position.

2. A valve according to claim 1, wherein said valve member is provided with a spigot which projects into said bore, and said controlling means comprises a cam associated with said valve member which, in the operating position, contacts said spigot.

3. A valve according to claim 2, wherein said controlling means also includes a plurality of cut-aways each situated in the immediate vicinity of said cam, said cut-aways being effective, in the shut off position, to allow said valve member to close under the prompting of its return spring.

4. A valve according to claim 2, wherein said cam is formed by a cylindrical member of circular cross-section concentric with the axis of rotation of said stem, said cylindrical member being provided with a flat.

5. A valve according to claim 2, wherein said cam is formed by a cylindrical member of circular cross-section which is eccentric to the axis of rotation of said stem.

6. A valve according to claim 1, which further comprises a pair of operating knobs at opposite ends of said stem.

7. A valve for simultaneously controlling a plurality of fluid conduits, the valve comprising, in combination:
 a valve body having a bore, a pair of spaced fluid inlet ducts respectively connected to the fluid conduits and communicating with said bore, and a pair of spaced fluid outlet ducts communicating with said bore;
 a valve seat disposed in each of said inlet ducts;
 a valve member located in each of said inlet ducts adjacent the valve seat therein;
 a rotatably mounted stem positioned within said bore for translating sliding movement with respect thereto, said stem having a pair of spaced control members respectively cooperating with said valve members and defining, with said bore, a plurality of annular spaces for separately interconnecting each of said inlet ducts with the corresponding outlet duct;
 spacer means on said stem intermediate said control means for preventing communication between said fluid conduits for all positions of said stem; and
 means for rotating said stem to actuate said control members and thereby move the valve members from a shut-off position against their corresponding seats to an operating position in which the valve members permit the flow of fluid from each of said inlet ducts to the corresponding outlet duct.

8. A valve for simultaneously controlling a plurality of fluid conduits, the valve comprising, in combination:
 a valve body having a cylindrical bore, a pair of spaced parallel fluid inlet ducts respectively connected to the fluid conduits and communicating with said bore, and a pair of spaced parallel fluid outlet ducts communicating with said bore, each of said ducts extending in a direction transverse to the axis of said bore;
 a valve seat disposed in each of said inlet ducts;
 a valve member located in each of said inlet ducts adjacent the valve seat therein;
 a biasing spring cooperating with the valve member in each said inlet duct for urging the valve member against the seat in the corresponding inlet duct;
 a rotatably mounted stem positioned within said cylindrical bore for axial sliding movement with respect thereto, said stem having a pair of spaced control members respectively cooperating with said valve members and defining, with said bore, a plurality of annular spaces for separately interconnecting each of said inlet ducts with the corresponding outlet duct;
 spacer means on said stem intermediate said control members for preventing communication between said fluid conduits for all positions of said stem; and
 means for rotating said stem to actuate said control members and thereby move the valve members in opposition to said biasing springs from a shut-off position against their corresponding seats to an operating position in which the valve members permit the simultaneous flow of fluid from each of said inlet ducts to the corresponding outlet duct.

9. A valve for simultaneously controlling a plurality of fluid conduits, the valve comprising, in combination:
 a valve body having a bore, a pair of spaced fluid inlet ducts respectively connected to the fluid conduits and communicating with said bore, and a pair of spaced fluid outlet ducts communicating with said bore;
 a valve seat disposed in each of said inlet ducts;
 a valve member located in each of said inlet ducts and including a spigot protruding into said bore;
 a biasing spring cooperating with the valve member in each said inlet duct for urging the valve member against the seat in the corresponding inlet duct;
 a rotatably mounted stem positioned within said bore for translatory sliding movement with respect thereto, said stem having a pair of spaced camming members respectively cooperating with the spigots on said valve members and defining, with said bore, a plurality of annular spaces for separately interconnecting each of said inlet ducts with the corresponding outlet duct;
 spacer means on said stem intermediate said camming members for preventing communication between said fluid conduits for all positions of said stem; and
 means for operating said stem to rotate the same and to perform said translatory sliding movement, the rotation and translatory sliding movement of said stem each actuating said camming members to move the valve members in opposition to said biasing springs from a shut-off position against their corresponding seats to an operating position in which the valve members permit the flow of fluid from each of said inlet ducts to the corresponding outlet duct.

10. A valve for simultaneously controlling a plurality of fluid conduits, the valve comprising, in combination:
 a valve body having a cylindrical bore, a pair of spaced parallel fluid inlet ducts respectively connected to the fluid conduits and communicating with said bore, and a pair of spaced parallel fluid outlet ducts communicating with said bore, each of said ducts extending in a direction transverse to the axis of said bore;
 a valve seat disposed in each of said inlet ducts;
 a valve member located in each of said inlet ducts and including a spigot protruding into said bore;
 a biasing spring cooperating with the valve member in each said inlet duct for urging the valve member against the seat in the corresponding inlet duct;
 a rotatably mounted stem positioned within said cylindrical bore for axial sliding movement with respect thereto, said stem having a pair of spaced cylindrical cams respectively cooperating with the spigots on said valve members and defining, with said bore, a plurality of annular spaces for separately interconnecting each of said inlet ducts with the corresponding outlet duct, the axis of each of said cylindrical cams being off-set with respect to the axis of said bore;
 spacer means on said stem intermediate said cams for preventing communication between said fluid conduits for all positions of said stem;

means defining an auxiliary passage between one of said inlet ducts and the corresponding outlet duct to bypass the valve member in said one inlet duct; and means for operating said stem to rotate the same and to axially slide said stem within said bore, the rotation of said stem actuating said cylindrical cams to move the valve members in opposition to said biasing springs from a shut-off position against their corresponding seats to an operating position in which the valve members permit the simultaneous flow of fluid from each of said inlet ducts to the corresponding outlet duct, the axial sliding of said stem blocking said auxiliary passage.

11. A valve for simultaneously controlling a plurality of fluid conduits, the valve comprising, in combination:

a valve body having a cylindrical bore, a pair of spaced parallel fluid inlet ducts respectively connected to the fluid conduits and communicating with said bore, and a pair of spaced parallel fluid outlet ducts communicating with said bore, each of said ducts extending in a direction transverse to the axis of said bore;

a valve seat disposed in each of said inlet ducts;

a valve member located in each of said inlet ducts and including a spigot protruding into said bore;

a biasing spring cooperating with the valve member in each said inlet duct for urging the valve member against the seat in the corresponding inlet duct;

a rotatably mounted stem positioned within said cylindrical bore for axial sliding movement with respect thereto, said stem having a pair of spaced cylindrical cams respectively cooperating with the spigots on said valve members and defining, with said bore, a plurality of annular spaces for separately interconnecting each of said inlet ducts with the corresponding outlet duct, each of said cylindrical cams having a flat cut-away portion in position to engage the spigot on the corresponding valve member;

spacer means on said stem intermediate said cams for preventing communication between said fluid conduits for all positions of said stem; and means for operating said stem to rotate the same and to axially slide said stem within said bore, the rotation and axial sliding movement of said stem each actuating said cylindrical cams to simultaneously move the valve members in opposition to said biasing springs from a shut-off position against their corresponding seats to an operating position in which the valve members permit the simultaneous flow of fluid from each of said inlet ducts to the corresponding outlet duct.

12. A valve for simultaneously controlling a plurality of fluid conduits, the valve comprising, in combination:

a valve body having a bore, a pair of spaced fluid inlet ducts respectively connected to the fluid conduits and communicating with said bore, and a pair of spaced fluid outlet ducts communicating with said bore;

a valve seat disposed in each of said inlet ducts;

a valve member located in each of said inlet ducts adjacent the valve seat therein;

a biasing spring cooperating with the valve member in each said inlet duct for urging the valve member against the seat in the corresponding inlet duct;

a rotatably mounted stem positioned within said cylindrical bore for axial sliding movement with respect thereto between two extreme positions, said stem having a pair of spaced cylindrical cams respectively cooperating with said valve members and defining, with said bore, a plurality of annular spaces for separately interconnecting each of said inlet ducts with the corresponding outlet duct;

spacer means on said stem intermediate said cams for preventing communication between said fluid conduits for all positions of said stem, the spacer means including a pair of spaced sealing members for forming a gap therebetween which is isolated with respect to the outlet ducts;

means for operating said stem to actuate said cylindrical cams and thereby move the valve members in opposition to said biasing springs from a shut-off position against their corresponding seats to an operating position in which the valve members permit the simultaneous flow of fluid from each of said inlet ducts to the corresponding outlet duct; and means defining an auxiliary passage between one of said inlet ducts and said bore to bypass the valve member in said one inlet duct, said auxiliary passage communicating with one of said outlet ducts when said stem is in one of said extreme positions and communicating with said isolated gap when the stem is in the other extreme position.

13. A valve for simultaneously controlling a plurality of fluid conduits, the valve comprising, in combination:

a valve body having a cylindrical bore, a pair of spaced parallel fluid inlet ducts respectively connected to the fluid conduits and communicating with said bore, and a pair of spaced parallel fluid outlet ducts communicating with said bore, each of said ducts extending in a direction transverse to the axis of said bore;

a valve seat disposed in each of said inlet ducts;

a valve member located in each of said inlet ducts and including a spigot protruding into said bore;

a biasing spring cooperating with the valve member in each said inlet duct for urging the valve member against the seat in the corresponding inlet duct;

a rotatably mounted stem positioned within said cylindrical bore for axial sliding movement with respect thereto between two extreme positions, said stem having a pair of spaced cylindrical cams respectively cooperating with the spigots on said valve members and defining, with said bore, a plurality of annular spaces for separately interconnecting each of said inlet ducts with the corresponding outlet duct;

spacer means on said stem intermediate said cams for preventing communication between said fluid conduits for all positions of said stem, the spacer means including a pair of spaced sealing members for forming a gap therebetween which is isolated with respect to the outlet ducts for all positions of said stem;

means for operating said stem to actuate said cylindrical cams and thereby move the valve members in opposition to said biasing springs from a shut-off position against their corresponding seats to an operating position in which the valve members permit the simultaneous flow of fluid from each of said inlet ducts to the corresponding outlet duct; and means defining an auxiliary passage between one of said inlet ducts and said bore to bypass the valve member in said one inlet duct, said auxiliary passage communicating with one of said outlet ducts when said stem is in one of said extreme positions and communicating with said isolated gap when the stem is in the other extreme position.

* * * * *